United States Patent [19]

Rericha et al.

[11] Patent Number: 4,862,745
[45] Date of Patent: Sep. 5, 1989

[54] FUEL TANK FLOAT

[75] Inventors: Brian F. Rericha, Downers Grove; Paul H. Miller, Wheaton, both of Ill.

[73] Assignee: Microdot Inc., Darien, Conn.

[21] Appl. No.: 215,991

[22] Filed: Jul. 7, 1988

[51] Int. Cl.[4] ............................................. G01F 23/76
[52] U.S. Cl. ................................................... 73/322.5
[58] Field of Search ...................... 73/305, 317, 322.5, 73/448; 116/228, 229

[56] References Cited

U.S. PATENT DOCUMENTS

| | | | |
|---|---|---|---|
| 1,838,399 | 12/1931 | Hodgson | 73/DIG. 5 |
| 3,320,922 | 5/1967 | Taylor et al. | 73/317 |
| 3,357,247 | 12/1967 | Bardes et al. | 73/306 |
| 4,189,786 | 2/1980 | Adler | 367/4 |
| 4,574,631 | 3/1986 | Johnson, Jr. | 73/317 |

FOREIGN PATENT DOCUMENTS

| | | | |
|---|---|---|---|
| 53521 | 3/1986 | Japan | 73/322.5 |
| 457894 | 8/1968 | Switzerland | 73/317 |

OTHER PUBLICATIONS

Eccosyn Syntactic Plastics, Emerson & Cuming, Inc. 1968 (U.S.A.).
Preliminary Technical Bulletin 14-2-10, Sep. 1968, Emerson & Cuming, Inc. (U.S.A.).

Primary Examiner—William A. Cuchlinski, Jr.
Assistant Examiner—W. Morris Worth
Attorney, Agent, or Firm—Lyman R. Lyon

[57] ABSTRACT

A fuel tank float for use with gasoline-alcohol mixtures comprising a closed container formed of a material resistant to such mixtures and filled with a slurry of a low specific gravity material such as hollow glass beads in a medium substantially similar to the gasoline-alcohol mixture to be gauged therewith.

2 Claims, 1 Drawing Sheet

U.S. Patent  Sep. 5, 1989  4,862,745
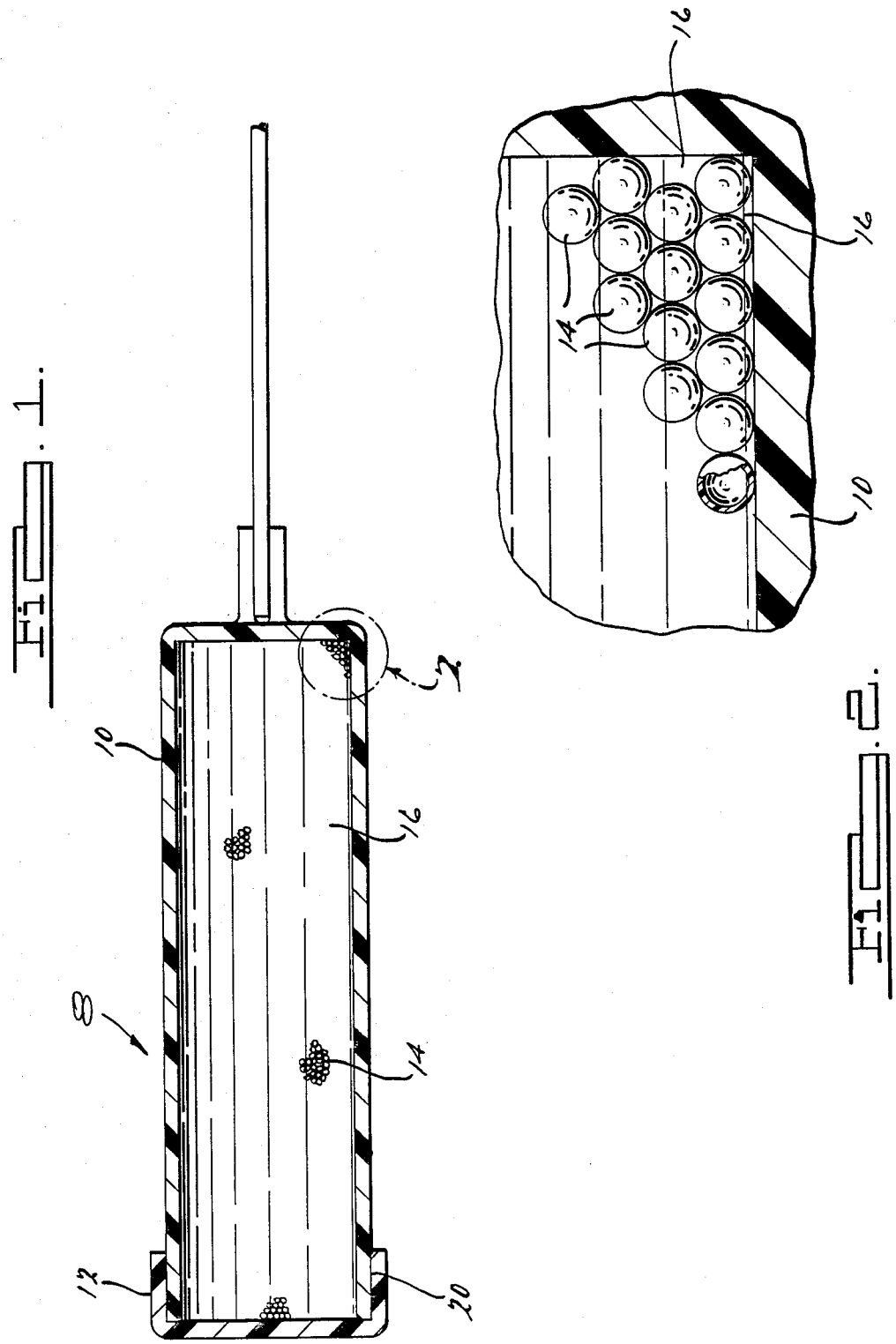

FUEL TANK FLOAT

BACKGROUND OF THE INVENTION

The instant invention relates to fuel tank floats for use with gasoline-alcohol fuels.

Known fuel tank floats are often made of brass or various types of foam rubber. Brass presents a problem due to its high cost. Foam rubber is available cheaply, but decomposes in gasoline-alcohol mixtures. The object of the instant invention is to provide an inexpensive fuel tank float that does not decompose in gasoline-alcohol mixtures and still maintains its desired specific gravity if the float develops a leak.

SUMMARY OF THE INVENTION

The float of the instant invention is used for gauging gasoline-alcohol fuels and comprises a closed container filled with a slurry of a low specific gravity material, such as hollow glass beads, in a medium of a gasoline-alcohol mixture substantially similar to the fuel being gauged. The container is composed of a material that is resistant to the fuel being gauged. The specific gravity of the aforementioned low specific gravity material is lower than the specific gravity of the fuel being gauged, and low enough to provide sufficient buoyancy for the entire float.

BRIEF DESCRIPTION OF THE DRAWINGS

FIG. 1 is a cross sectional view of a float in accordance with the present invention; and FIG. 2 is an enlarged view of circle 2 of FIG. 1 of this float interior, showing in detail the arrangement of the low specific gravity material.

DETAILED DESCRIPTION OF THE PREFERRED EMBODIMENT OF THE INVENTION

As seen in FIG. 1, a float 8, in accordance with the preferred construction embodiment of this invention comprises a plastic container 10 and cap 12 formed of a material that is resistant to gasoline-alcohol mixtures. In accordance with one feature of this instant invention, the container 10 is filled with a slurry of a low specific gravity material such as hollow glass beads 14 in a gasoline-alcohol medium 16 substantially similar to the fuel (not shown) being gauged. The beads 14 have a low enough specific gravity so that the filled closed container 10 is buoyant in the fuel (not shown) being gauged. The gasoline-alcohol medium 16 prevents an inflow of fuel, and a corresponding change in the specific gravity of the float 8, should the float 8 leak. The cap 12 is snap fit, screwed, or ultrasonically welded to the container.

While the preferred embodiment of the invention has been disclosed, it should be appreciated that the invention is susceptible of modification without departing from the scope of the following claims.

We claim:

1. A float for gauging the level of a gasoline-alcohol fuel in a tank, said float comprising
   a closed container composed of a material resistant to said fuel; and
   a slurry in said container of a material in a medium substantially similar to said fuel, said material having a specific gravity lower than said fuel.

2. A fuel tank float according to claim 1 wherein said low specific gravity material comprises hollow spherical glass beads.

* * * * *